United States Patent [19]

Evans

[11] Patent Number: 4,942,027
[45] Date of Patent: * Jul. 17, 1990

[54] METHOD FOR PREPARING FERRIERITE
[75] Inventor: Wayne E. Evans, Houston, Tex.
[73] Assignee: Shell Oil Company, Houston, Tex.
[*] Notice: The portion of the term of this patent subsequent to Jan. 3, 2006 has been disclaimed.
[21] Appl. No.: 250,874
[22] Filed: Sep. 28, 1988

Related U.S. Application Data

[63] Continuation-in-part of Ser. No. 893,430, Aug. 5, 1986, Pat. No. 4,795,623.
[51] Int. Cl.[5] .............................................. C01B 33/34
[52] U.S. Cl. .................................................... 423/328
[58] Field of Search ................................... 423/328 T

[56] References Cited

U.S. PATENT DOCUMENTS

| 3,933,974 | 1/1976 | Winquist | 423/118 |
|---|---|---|---|
| 3,966,883 | 6/1976 | Vaughan et al. | 423/329 |
| 4,000,248 | 12/1976 | Martin | 423/329 |
| 4,017,590 | 4/1977 | Cormier et al. | 423/329 |
| 4,088,739 | 5/1978 | Vaughan et al. | 423/329 |
| 4,251,499 | 2/1981 | Nanne et al. | 423/329 |
| 4,343,692 | 8/1982 | Winquist | 208/111 |
| 4,377,502 | 3/1983 | Klotz | 252/455 |
| 4,430,314 | 2/1984 | Audeh et al. | 423/329 |
| 4,562,055 | 12/1985 | Arika et al. | 423/329 |
| 4,578,259 | 3/1986 | Morimoto et al. | 423/329 |
| 4,613,488 | 9/1986 | Van Erp et al. | 423/328 |
| 4,663,140 | 5/1987 | Van Erp et al. | 423/328 |
| 4,795,623 | 1/1989 | Evans | 423/328 T |

FOREIGN PATENT DOCUMENTS 0055529 7/1982 European Pat. Off. .

OTHER PUBLICATIONS

"Composition and Catalytic Properties of Synthetic Ferrierite", by C. L. Kibby, A. J. Perrotta & F. E. Massoth, May 9, 1974, pp. 256-272.

Primary Examiner—Robert L. Stoll
Assistant Examiner—Stuart L. Hendrickson
Attorney, Agent, or Firm—Kimbley L. Muller

[57] ABSTRACT

This invention concerns a time-effective method of manufacture for a sodium ferrierite precursor of a hydrogen ferrierite catalytic composition of matter by crystallizing an aqueous mixture of sodium hydroxide, an aluminum compound, a silicon compound and a nitrogen-containing compound, which mixture possesses 1.60 to 3.40 moles of sodium oxide and 0.70 to 1.60 moles of aluminum oxide per 25 moles of silicon oxide. The ultimate use of the resultant catalyst is for removing wax from a lubricating oil (preferably a light lubricating oil) with or without the metals of Group VIII and/or Group VIB used in association with the catalyst.

15 Claims, 3 Drawing Sheets

METHOD FOR PREPARING FERRIERITE

CROSS RELATED APPLICATIONS

This application is a continuation in part of U.S. Ser. No. 893,430 filed Aug. 5, 1986 and issued as U.S. Pat. No. 4,795,623 on Jan. 3, 1989 all of the teachings of which are herein incorporated by reference.

FIELD OF THE INVENTION

This invention is concerned with a method of manufacture of a catalyst precursor commonly denoted as sodium ferrierite from which hydrogen ferrierite can be derived. It is specifically directed to a method for preparing sodium ferrierite in a time efficient manner so that maximum activity of the resultant hydrogen ferrierite can be obtained derivative of the sodium ferrierite after a relatively short time of crystallization. The resultant hydrogen ferrierite catalyst derived from the sodium ferrierite is preferably utilized in dewaxing of high viscosity index (HVI) oils derived from crude oils indigenously inured with relatively high wax content. The catalyst is more specifically used in lowering of pour points in lubricating oils having a viscosity of between 80 and 150 (SSU).

BACKGROUND OF THE INVENTION

Refining of petroleum crude minerals to excise therefrom a variety of lubricating oils which can function with a high viscosity index has become an extremely complex and developed area of invention and experimentation. In treating heavier oils, such as bright stock raffinates, a ZSM-5 catalyst has no peers. However, in treating light lubricating oils such as a HVI 100 or 150, it has been found that a higher viscosity index is retained if the oil is dewaxed in the presence of a ferrierite catalyst having metals incorporated therewith. The synthetic ferrierite may be prepared by such processes as described in U.S. Pat. Nos. 3,966,883; 4,000,248; 4,017,590; and 3,933,974, all of the disclosures of which are herein incorporated by reference.

One process which teaches catalyst hydrodewaxing of a petroleum feedstock, such as distillates and residual fractions, occurs in the presence of a catalyst comprising a synthetic ferrierite zeolite with at least one metal from the group consisting of Group VIB, Group VIIB and Group VIII metals incorporated therewith. In 1982, U.S. Pat. No. 4,343,692 issued to Winquist for such a process having unrecognized advantageous viscosity index retention. The instant invention is concerned with a time efficient method of manufacture of a catalyst composition of matter precursor whose dewaxing abilities (after conversion to the hydrogen species) were adroitly promulgated by Winquist, in U.S. Pat. No. 4,343,692.

One method of preparing a catalyst used in the last mentioned patent is a process for preparing ferrierite as described in Nanne et al. U.S. Pat. No. 4,251,499. The molar compositions of the starting material in Nanne et al are exemplified by 13 different examples, nine of which resulted in the production of relatively pure ferrierite. The starting components of alumina and sodium oxide to silica vary to an extent both smaller and larger than the narrow range of this invention. Regardless of the mole ratios taught in Nanne et al, a reaction time of at least 113 hours is described for the preparation of a catalyst with sufficient catalytic activity to result in high VI lubricating oils via dewaxing of a wax-containing lubricating oil. This invention is an improvement upon the method of manufacture of the ferrierite catalyst of Nanne et al and a step forward in the art of catalyst preparation techniques.

In the *Journal of Catalysis*, Vol. 35 at pages 256–272 (1974), an article by C. L. Kibby et al. describes the composition and catalytic properties of synthetic ferrierite. The time of preparation was greatly shortened by the seeding with crystals of 10 to 100 microns at 310° C. Recognition is made in this publication that once activity begins to inure to the synthetic ferrierite, it comes very quickly and ultimate catalytic activity is rapidly accomplished. Also, cognizance is made of the fact that heating of the aqueous mixture beyond the time required for essentially complete crystallization does not seem to have either a deleterious or an enhancing consequence upon resultant catalytic activity. As shown in the data of this case, this has now been discovered to be not a completely accurate statement at least as it applies to extended crystallization of sodium ferrierite within the molar ratio recipes of this invention.

In Cormier et al, U.S. Pat. No. 4,017,590, a synthetic ferrierite is prepared within 2–96 hours at 230° –310° C. without the use of a nitrogen template precursor. The mole ratios of aluminum and total alkali are much larger than contemplated in the instant invention plus a carbonate-bicarbonate buffer is maintained during crystallization. The sodium ferrierite catalyst precursor of this invention is prepared, i.e. crystallized, without the presence of carbon dioxide. Also, employment of large quantities of aluminum in Cormier et al would result in incomplete crystallization of sodium ferrierite.

Additional references cited in the above U.S. Ser. No. 893,430 include: U.S. Pat. Nos. 4,663,140 and 4,613,488 Van Erp et al.; 4,562,055, Arika et al.; 4,088,739, Vaughan et al.; 4,578,259, Morimoto ; 4,377,502, Klotz; 4,430,314 Audeh et al., and 0,055,529, Seddon et al.

OBJECTS AND EMBODIMENTS

It is an object of this invention to provide a method of manufacture for an alkali or sodium ferrierite catalyst precursor in the shortest crystallization time to inure maximal catalytic activity to a hydrogen ferrierite derived therefrom.

Another object of this invention is to provide a method of manufacture for a synthetic sodium ferrierite catalyst precursor utilizing rapid turnover time of crystallizing autoclaves for the crystallization of an aqueous precursor mixture in order to substantially reduce the cost of preparation of the synthetic sodium ferrierite.

Yet another object of this invention is to provide specific mole ratios of certain components within a defined or target area that is critical to the unexpected rapid crystallization time of the sodium ferrierite.

Yet another object of this invention is to provide a method of preparing a sodium ferrierite catalyst precursor having the ability to derive a viable synthetic hydrogen ferrierite, which if associated with particular catalytic metals, can be useful as a catalyst in other hydrocarbon conversion processes such as cracking, isomerization, dealkylation and hydrocracking.

One embodiment of this invention resides in a time effective method of manufacture of sodium ferrierite which comprises crystallizing an aqueous mixture at hydrothermal crystallizing conditions of from about 100° to about 400° C. over a period of time effective to form a crystalline sodium ferrierite, said aqueous mixture comprising a sodium compound, one or more aluminum compounds, a silicon compound and one nitrogen compound selected from the group consisting of piperidine, piperazine, pyridine, 4-picoline-N-oxide and 4-picoline, wherein the mole ratios of both the sodium compound and aluminum compound in relation to the silicon compound, calculated on the basis of the oxide form of said sodium compound, aluminum compound and silicon compound, is equal to the presence of 1.60 to 3.40 moles of sodium oxide per 25 moles of said silicon oxide and 0.7 to 1.60 moles of said aluminum oxide per 25 moles of said silicon oxide, and wherein water is present in a molar ratio of 5-500 moles of water per mole of said silicon oxide and said nitrogen compound is present in a molar ratio of 0.5 to 1.0 moles of said nitrogen compound per mole of said silicon oxide and where the mole ratio of sodium oxide to aluminum oxide is greater than 1, and calcining the resulting crystalline material in air to remove occluded amine.

Another embodiment of this invention comprises a method of manufacture of a sodium catalyst precursor which comprises: forming an admixture of compounds in an aqueous solvent of one or more compounds of sodium, one or more compounds of aluminum, one or more compounds of silicon and piperidine wherein the molar ratio of said compounds when calculated on the basis for the oxide form is equal to: 1.60 to 3.40 moles of sodium oxide per 25 moles of said silicon oxide; 0.70 to 1.60 moles of said aluminum oxide per mole of 25 moles of said silicon oxide; 125 to 12,500 moles of water per 25 moles of silicon oxide; 1.25 to 25 moles of said piperidine per 25 moles of said silicon oxide; and a ratio of sodium oxide to aluminum oxide of greater than 1; crystallizing said aqueous admixture to form a sodium ferrierite at hydrothermal treatment conditions including a temperature of from 100° to 400° C. and a period of time greater than 10 hours; and removing said crystallized sodium ferrierite from the residuum molar liquor of said crystallization mixture, and calcining the resulting crystalline material in air to remove occluded amine.

BRIEF DESCRIPTION OF THE INVENTION

Succinctly, this invention deals with a method of preparing sodium ferrierite over a relatively short crystallization period greater than 10 hours, preferably greater than 11 hours and less than 100 hours, and which does not necessitate expensive energy-consuming time of crystallization in order to elevate the dewaxing activity of the catalyst once the sodium species is converted to hydrogen species. It is critical to this invention, to attain quick formation via crystallization of the sodium ferrierite that an aluminum compound or compounds be added in the form of a salt to the gel admixture, but calculated in the oxide form, in a specific mole ratio of 0.70 to 1.60 moles of aluminum compounds per 25 moles silicon compound or compounds, expressed as silicon oxide. Conjunctly, sodium, normally added as sodium hydroxide, must be present in a mole ratio, expressed as sodium oxide, of 1.60 to 3.40 moles of sodium oxide per 25 of silicon, expressed as silicon oxide.

DETAILED DESCRIPTION OF THE INVENTION

This invention is an improvement over the sodium ferrierite method of preparation disclosed in U.S. Pat. Nos. 4,251,499 and 4,017,590. Essentially, this method of sodium ferrierite preparation reduces the time necessary to attain a viable catalyst precursor when the particular mole ratio of component in the aqueous mixture are established and maintained. As demonstrated in the instant drawings i.e. FIG. 1, a certain target area of both aluminum and sodium compounds to silicon compounds must be attained before initiation of crystallization of the aqueous mixture, and if such target area of mole ratios is attained, crystallization to formation of the sodium ferrierite catalyst precursor occurs over a relatively short period of time.

A preparer of a sodium ferrierite aluminosilicate should first begin with an aqueous admixture of at least four components. These four components are one or more sodium compounds, one or more aluminum compounds, one or more silicon compounds, and at least one nitrogen compound. The quantity of water to silicon compound is usually within the molar range of 5-500 moles of water per mole of silicon compound wherein the silicon is calculated in the oxide form. The mole ratio of the nitrogen-containing compound to the silicon compound, again calculated in the oxide form, is usually in the range of 0.05 to 1.0 moles of nitrogen compound per mole of silicon compound. The quantities of sodium compound and aluminum compound per the quantity of silicon compound are critical to this time efficient method of crystallization. Both of these molar quantities fall within specific limits to take advantage of this shorter time of crystallization of the sodium ferrierite catalyst precursor. The sodium compound, expressed as sodium oxide, is present in a mole ratio of 1.60 to 3.40 moles of the sodium oxide per 25 moles of the silicon oxide. Concomitant therewith, the aluminum compound, expressed as aluminum oxide, is present in a mole ratio of 0.70 to 1.60 moles of aluminum oxide per 25 moles of the silicon oxide.

The formation of a synthetic alkali metal ferrierite may be viable with any alkali metal oxide other than sodium oxide, i.e. lithium oxide, potassium oxide, but the best results are attained with sodium oxide to arrive at sodium ferrierite. The presence and composition of the nitrogen-containing compound is very important to the formation of the resultant sodium ferrierite catalyst precursor. It is most preferred that the nitrogen compound be piperidine or an alkyl piperidine. Examples of the alkyl piperidine are those in which the alkyl substituent is bonded to a carbon atom of the piperidine molecule such as 2-methyl, 3-methyl, 4-methyl, 2-ethyl, 3-ethyl and 2-propyl piperidine. Also, piperidines are viable in which the alkyl substituent is bonded to the nitrogen atom of the piperidine molecule such as 1-methyl, 1-ethyl, 1-propyl, 1-butyl, 1-pentyl, 1-octyl, 1-dodecyl, piperidine. Other nitrogen-containing compounds may also be utilized such as piperazine, pyridine, 4-picoline and oxide, and 4-picoline with the piperidine and alkyl piperidines being the most preferred nitrogen-containing compounds. Also contemplated as a viable nitrogen-containing compound are derivatized pyridines and piperidines.

The quantities of the sodium, aluminum and silicon are calculated on the basis of their oxide forms, but need not be added to the gel as such. For example, aluminum may be added in the form of a salt, i.e. aluminum sulfate; sodium may be added in the hydroxide form; while silicon may be added in the form of a salt; i.e. sodium silicate or in the oxide form, i.e. silica gel.

The aqueous mixture is hydrothermally heated at a temperature of between 100° and 400° C., preferably between 150°-250° C., wherein a solid product comprising a sodium ferrierite is attained from the aqueous mixture via crystallization, which is then calcined in air at a temperature of from 500° C. to 700° C. for 2 to 5 hours to remove occluded amine. Previously, it was believed to attain complete crystallization it was necessary to crystallize former gel admixtures containing the prescribed nitrogen compound for a period of time of well over 100 hours. However, applicant has now found that as long as the molar ratios of sodium oxide to silicon oxide and aluminum oxide to silicon oxide are maintained within the target range, this crystallization time can be surprisingly reduced as much as seven fold. This shortened time of crystallization must be more than 10 hours, and preferably more than 11 hours, as crystallization will usually not be completed before passage of that time period in any event and any aluminosilicate recovered from that period of crystallization will generally be amorphous or partially amorphous aluminosilicate. The minimum crystallization time is in the range of 10 hours or 11 hours but an exact minimum duration of crystallization time is simply not ascertainable. It must also be realized that immediately after crystallization begins, the sodium ferrierite rapidly proceeds to ultimate crystallization over a very short period of time. The crystallizing may occur over as many as 100 hours. This permits ferrierite manufacture over a period of time equal to from 10 to 100 hours. As shown in FIG. 4 of the instant drawings, crystallization of the catalyst precursor over an additional time will not result in a substantial increase in catalytic activity for the derived hydrogen ferrierite but is clearly within the scope of this invention. Surprisingly, it has also been found that catalytic activity of the hydrogen ferrierite is actually diminished somewhat when crystallization time is extended past 20 hours, although the reasons for this unexpected loss in catalytic activity from over extended hydrothermal crystallization are not well understood. It can however be speculated that some alteration of microcrystal size is responsible for the demise in catalytic activity.

This invention is further described in regard to the following examples which demonstrate the criticality of the ratios of sodium oxide to silicon oxide and aluminum oxide to silicon oxide. The instant drawings graphically illustrate a summary of the results derivative of following this method of manufacture. The below described examples and drawings are not to be construed as a limitation upon the broad aspects of this invention, but however are exemplary to highlight how to use and how to make a sodium ferrierite catalyst precursor or resultant hydrogen ferrierite via ion exchange by the instant method of manufacture.

EXAMPLES

EXAMPLE 1

Figure 1:
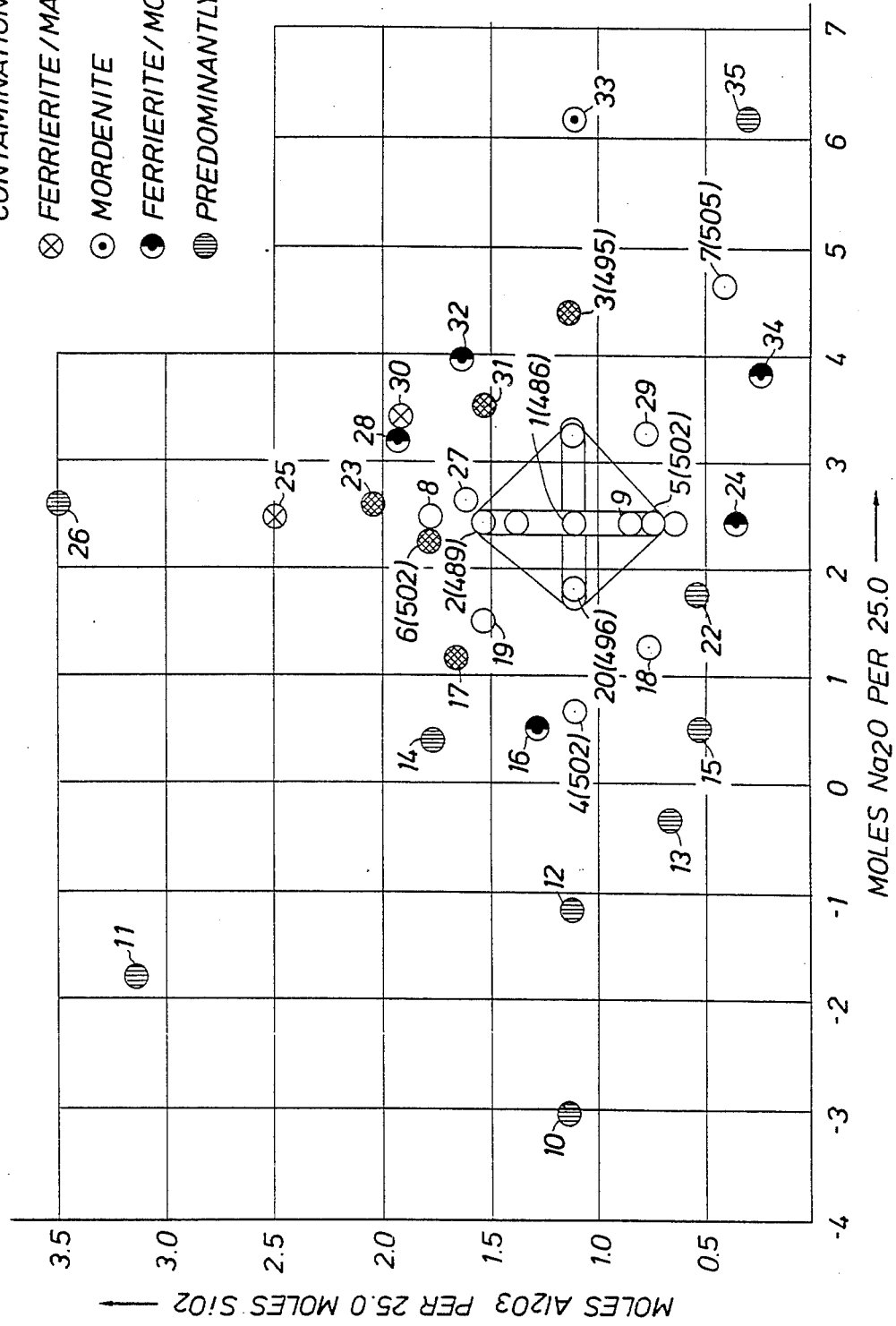
FIG. 1 is a graphic display of about 35 aluminosilicate compositions showing the critical target area for the moles of aluminum oxide and sodium oxide per 25 moles of silicon dioxide.

In these experiments, a synthesis recipe was concocted with the molar ratios of $SiO_2/Al_2O_3/Na_2O/H_2O$/peridine being equal to 25.0/xx/yy/518/9.8 wherein the quantity of aluminum oxide equals xx and the quantity of sodium oxide equals yy. All of the recipes were added to an autoclave equipped with stirring means and heated at a temperature between 155° and 160° C. for a total of 16 hours. After cooling, the contents of the autoclave were filtered, rinsed with water, dried at 125° C. overnight, and calcined in air to remove occluded amine. The synthetic sodium ferrierites were converted to the hydrogen form by exchange with ammonium nitrate followed by calcination and ion exchanged will palladium tetramine dinitrate and were then tested for catalytic activity to dewax a hydrotreated phenol extracted Arabian light oil 100 (ABL) with a pour point and chemical constituencies as set forth in Table 1.

TABLE 1

| Pour Point: | 75 deg F. |
|---|---|
| Density: | 0.8486 g/cc |
| Elemental Analysis: | C 86.19% w |
| | H 13.79% w |
| | N 11 ppm |
| | S 980 ppm |

The dewaxing conditions were 1,200 lbs. pressure with a hydrogen to oil ratio of 5,000 SCFB/BBL at a liquid hourly space velocity of 1.0. Table 2 lists the relative molar content of the aluminum oxide and sodium oxide per 25 moles of silicon dioxide used in the crystallization of sodium ferrierite catalyst precursor, from which the hydrogen species of ferrierite were prepared. The respective quantities of sodium oxide and aluminum oxide in Table 2 are shown as "Yes" when within the target range or "No" when extrinsic to the target range. The instant claimed target area is only achieved by the nomenclature of both sodium oxide and aluminum oxide being indicated as "Yes", i.e. tests 1, 2, 5, 6, 9, 20, 21, 23 and 29. Where necessary to determine criticality, activity tests were conducted by dewaxing the ABL feed. The highest activity of catalysts are indicted by the lowest reactor temperatures. While a crystallinity of near 100% is desirable, it is feasible to operate a dewaxing catalyst with less than 100% crystallinity as long as the activity is sufficient to attain target pour points.

TABLE 2

| Moles of SiO$_2$ | Moles of Al$_2$O$_3$ | Moles of Na$_2$O | Reactor Temperature[1] | % Crystallinity | Crystalline Product | Time of Crystallization |
| --- | --- | --- | --- | --- | --- | --- |
| (1) 25.0 | 1.07 (Yes) | 2.48 (Yes) | 486 | — | Ferrierite | 16 hours |
| (2) 25.0 | 1.35 (Yes) | 2.48 (Yes) | 489 | 93 | Ferrierite | 16 hours |
| (3) 25.0 | 1.07 (Yes) | 4.32 (No) | 495 | — | Ferrierite and Mordenite | 16 hours |
| (4) 25.0 | 0.62 (No) | 1.07 (No) | 502 | — | Ferrierite | 16 hours |
| (5) 25.0 | 0.65 (Yes) | 2.46 (Yes) | 502 | 72 | Ferrierite | 16 hours |
| (6) 25.0 | 1.75 (Yes) | 2.48 (Yes) | 502 | 85 | Ferrierite | 16 hours |
| (7) 25.0 | 0.35 (No) | 4.62 (No) | 505 | 100 | Ferrierite | 16 hours |
| (8) 25.0 | 2.00 (No) | 2.51 (Yes) | Not tested | 71 | Contaminated with Mordenite | 16 hours |
| (9) 25.0 | 0.85 (Yes) | 2.46 (Yes) | Not tested | 99 | Ferrierite | 16 hours |
| (10) 25.0 | 1.07 (Yes) | −3.08 (No) | Not tested | — | Amorphous | 16 hours |
| (11) 25.0 | 2.50 (No) | −1.83 (Yes) | " | — | Amorphous | 16 hours |
| (12) 25.0 | 1.10 (Yes) | −1.20 (No) | " | — | Amorphous | 16 hours |
| (13) 25.0 | 0.67 (Yes) | −0.33 (No) | " | — | Amorphous | 16 hours |
| (14) 25.0 | 1.75 (Yes) | 0.42 (No) | " | — | Amorphous | 16 hours |
| (15) 25.0 | 0.50 (No) | 0.50 (No) | Not tested | — | Amorphous | 16 hours |
| (16) 25.0 | 1.25 (Yes) | 0.50 (No) | " | — | Ferrierite/Mordenite | 16 hours |
| (17) 25.0 | 1.67 (Yes) | 1.17 (No) | " | — | Ferrierite/Contamination | 16 hours |
| (18) 25.0 | 0.75 (Yes) | 1.25 (No) | " | — | Ferrierite | 16 hours |
| (19) 25.0 | 1.50 (Yes) | 1.50 (No) | " | — | Ferrierite | 16 hours |
| (20) 25.0 | 1.07 (Yes) | 1.75 (Yes) | 496 | — | Ferrierite | 16 hours |
| (21) 25.0 | 1.07 (Yes) | 3.25 (Yes) | 494 | — | Ferrierite | 16 hours |
| (22) 25.0 | 0.50 (No) | 1.75 (Yes) | — | — | Amorphous | 16 hours |
| (23) 25.0 | 1.75 (Yes) | 2.25 (Yes) | — | — | Ferrierite with contaminants | 16 hours |
| (24) 25.0 | 0.35 (No) | 2.45 (Yes) | — | — | Ferrierite with Mordenite | 16 hours |
| (25) 25.0 | 2.50 (No) | 2.49 (Yes) | — | — | Ferrierite/Magadiite | 16 hours |
| (26) 25.0 | 3.50 (No) | 2.54 (Yes) | — | — | Amorphous | 16 hours |
| (27) 25.0 | 1.63 (No) | 2.63 (Yes) | — | — | Ferrierite | 16 hours |
| (28) 25.0 | 2.25 (No) | 3.16 (Yes) | — | — | Ferrierite with Mordenite | 16 hours |
| (29) 25.0 | 0.75 (Yes) | 3.25 (Yes) | — | — | Ferrierite | 16 hours |
| (30) 25.0 | 2.00 (No) | 3.49 (No) | — | — | Ferrierite/Magadiite | 16 hours |
| (31) 25.0 | 1.50 (Yes) | 3.50 (No) | — | — | Ferrierite with contaminants | 16 hours |
| (32) 25.0 | 1.67 (No) | 3.92 (No) | — | — | Ferrierite with Mordenite | 16 hours |
| (33) 25.0 | 1.07 (Yes) | 6.17 (No) | — | — | Mordenite | 16 hours |
| (34) 25.0 | 0.25 (No) | 3.92 (No) | — | — | Ferrierite with Mordenite | 16 hours |
| (35) 25.0 | 0.25 (No) | 6.20 (No) | — | — | Amorphous | 16 hours |

[1]Temperature required to achieve a dewaxed oil with a pour point of 20° F. at the stated process conditions.

Note must be taken that the catalyst in which mordenite was present in addition to ferrierite exhibited an initial activity comparable to that of pure hydrogen ferrierite but the viscosity index of the dewaxed oil was lower than that of dewaxed oil derived from pure hydrogen ferrierite catalyst. The reaction temperatures are shown juxtaposed to the applicable tests in FIG. 1. Some of the crystalline aluminosilicates were not tested due to time constraints. No reasonable purpose would be achieved by testing the amorphous compositions.

Figure 2:
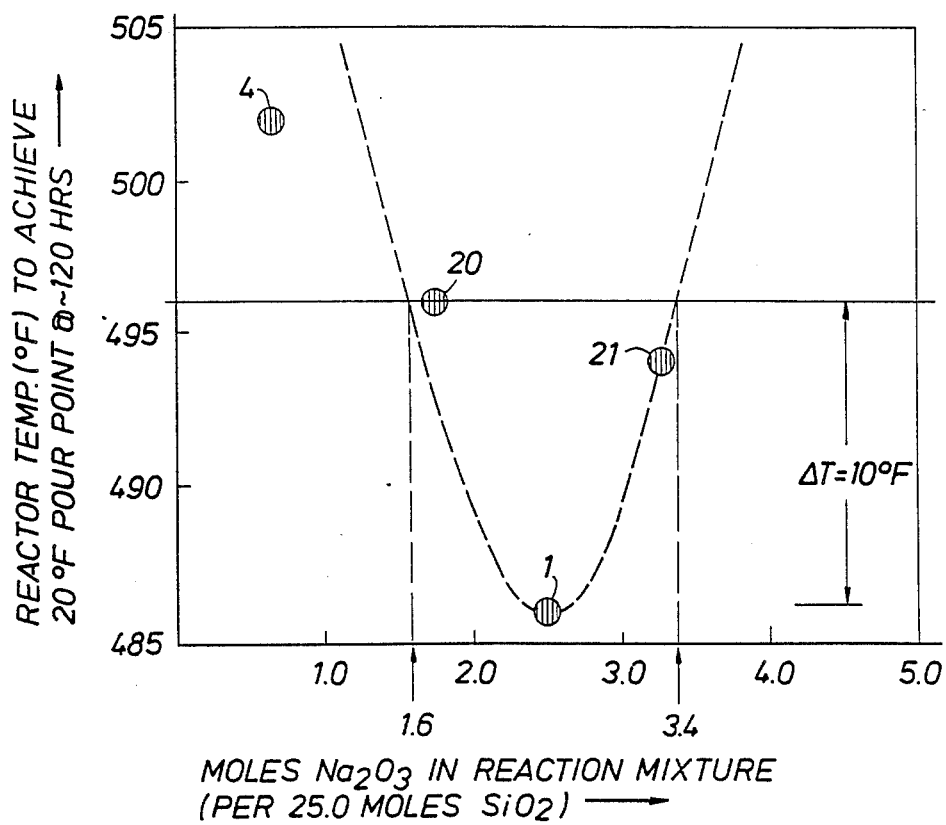
FIG. 2 is a graphic display of the activity of the resultant hydrogen ferrierite catalyst derived from a prepared sodium ferrierite based on the level of sodium oxide per 25 moles of silicon oxide for a constant level of aluminum oxide.
Figure 3:
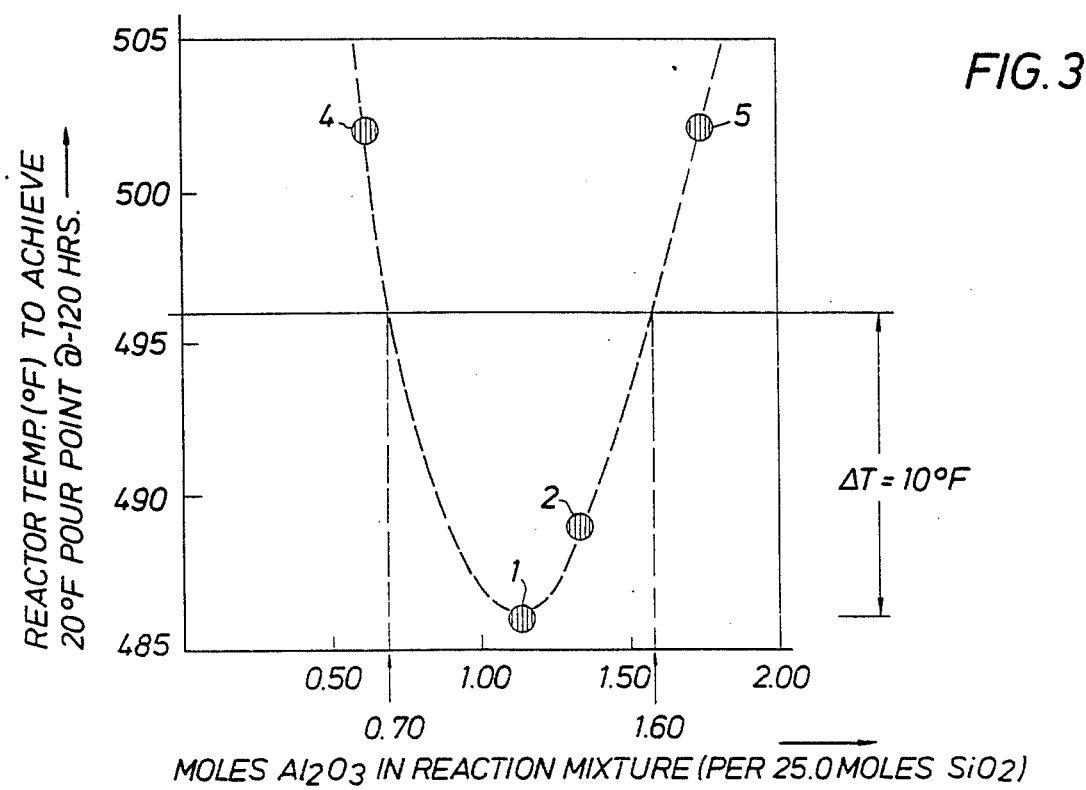
FIG. 3 is a graphic display of the activity of hydrogen ferrierite derived from a prepared sodium ferrierite catalyst with the particular mole ratio of aluminum oxide to 25 moles of silicon oxide for a constant level of sodium oxide.

The activity tests of aluminosilicates derived from gels with compositions, both inside and outside the target range of the mole ratios of aluminum oxide and sodium oxide, to silicon oxide are shown in FIG. 1. FIG. 2 shows respective catalytic activities of a hydrogen ferrierite derived by ion exchange of a sodium ferrierite crystallized at a constant ratio of SiO$_2$/Al$_2$O$_3$ (25.0:1.07) in the initial crystallization gel. FIG. 3 shows the respective catalytic activities of catalysts derived from sodium ferrierite prepared from a recipe wherein sodium oxide level in the initial aqueous crystallization gel is constant i.e. SiO$_2$/Na$_2$O=25.0/2.48. It can clearly be seen that catalyst activity is highly dependent upon both the sodium oxide level and the aluminum oxide level, relative respectively to the silicon oxide level.

Figure 4:
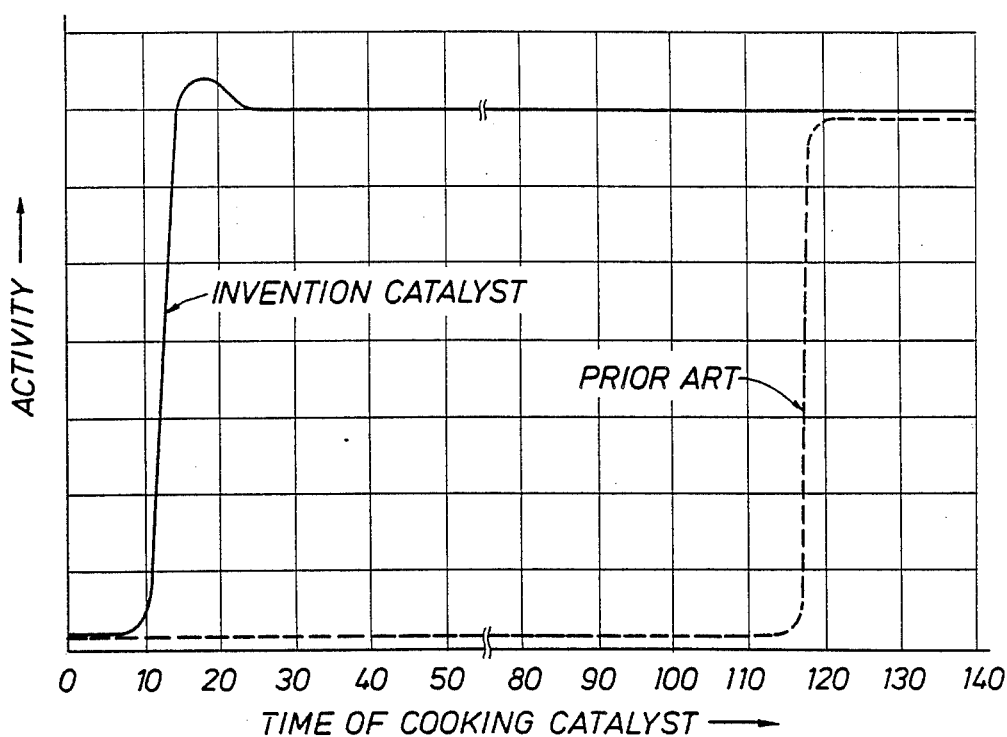
FIG. 4 demonstrates that the time of continued hydrothermal treatment is not essential to the formation of the sodium ferrierite once the sodium ferrierite has attained a crystallized form.

Both of these molar ratios must be within a specific range to achieve the observed great reduction in reactor temperature to attain a 20° F. pour point lubricating oil. FIG. 4 demonstrates hypothetically the result of continued hydrothermal treatment of an aluminosilicate once crystallization has started. Extended hydrothermal treatment may actually hinder the resultant activity of the derived catalyst once the very rapid rate of crystallization is complete. FIG. 4 also demonstrates that if the aluminum oxide and sodium oxide are maintained within the proper mole ratios, the time of crystallization of the catalyst precursor is reduced to about 12 hours versus the prior art method of U.S. Pat. No. 4,251,499 which necessitated nearly 113 hours before sodium ferrierite was crystallized. This latter figure also demonstrates the rapid formation of the sodium ferrierite once crystallization begins.

EXAMPLE 2

In this example sodium ferrierite catalyst precursors were derived using the center of the target area with respect to sodium and aluminum content. The recipe correlates to Test 1 wherein the initial mixture comprised, before crystallization:

| | |
| --- | --- |
| SiO$_2$Al$_2$O$_3$ | 25.0:1.07 |
| SiO$_2$/Na$_2$O | 25.0:2.48 |

-continued

| SiO$_2$/H$_2$O/piperidine | 25.0/518/9.8 |

Time of crystallization was varied for Tests 36–49 and the sodium ferrierite (where crystallized) analyzed for its X-ray diffraction pattern. The results are set forth in Table 3.

TABLE 3

| Test No. | Time of Crystallization at Conditions of Example 1 | Products Determined by X-ray Pattern |
| --- | --- | --- |
| 36 | 3 | Amorphous |
| 37 | 11 | Pure Na Ferrierite |
| 38 | 13 | Pure Na Ferrierite |
| 39 | 15 | Pure Na Ferrierite |
| 40 | 20 | Pure Na Ferrierite |
| 41 | 21 | Pure Na Ferrierite |
| 42 | 34 | Pure Na Ferrierite |
| 43 | 45 | Pure Na Ferrierite |
| 44 | 51 | Pure Na Ferrierite |
| 45 | 65 | Pure Na Ferrierite |
| 46 | 65 | Pure Na Ferrierite |
| 47 | 83 | Pure Na Ferrierite |
| 48 | 91 | Pure Na Ferrierite |
| 49 | 104 | Pure Na Ferrierite |

The time of crystallization is a critical parameter in making pure sodium ferrierite, although once the time period of 10 to 20 hours is attained (again within the target mole ratios of aluminum and sodium) then continued crystallization is not productive, i.e. hydrothermal treatment can go on indefinitely without impairing the quality of the sodium ferrierite as determined by X-ray diffraction. These data confirm the hypothetical crystallization times exemplified in FIG. 4, supra. It should also be noted that the sodium ferrierite derived at 13 hours was very high quality and the derived hydrogen ferrierite therefrom was found to be extremely active as shown in FIG. 1, Test 1.

EXAMPLE 3

This example was promulgated to ascertain the effects of continued hydrothermal treatment on hydrogen ferrierite catalyst activity past the time at which crystallization of sodium ferrierite is complete. The recipe of Example 2 (Test 1) was followed which again was in the optimal target area. The hydrogen ferrierite catalyst derived from the sodium ferrierite was tested for dewaxing performance with the ABL 100 oil described in Table 1 above at the same test conditions as established for catalysts of Tests 1–7, 20 and 21. Table 4 exemplifies those results.

TABLE 4

| Test No. | Time of Crystallization at Conditions of Example 1 | Reactor Temperature (°F.) Required to Reach Target Pour Point of 20° F. |
| --- | --- | --- |
| 50 | 11 | 487 |
| 51 | 13 | 487 |
| 52 | 15 | 486 |
| 53 | 15 | 486 |
| 54 | 20 | 495 |
| 55 | 45 | 494 |
| 56 | 83 | 494 |
| 57 | 108 | 492 |

Figure 5:
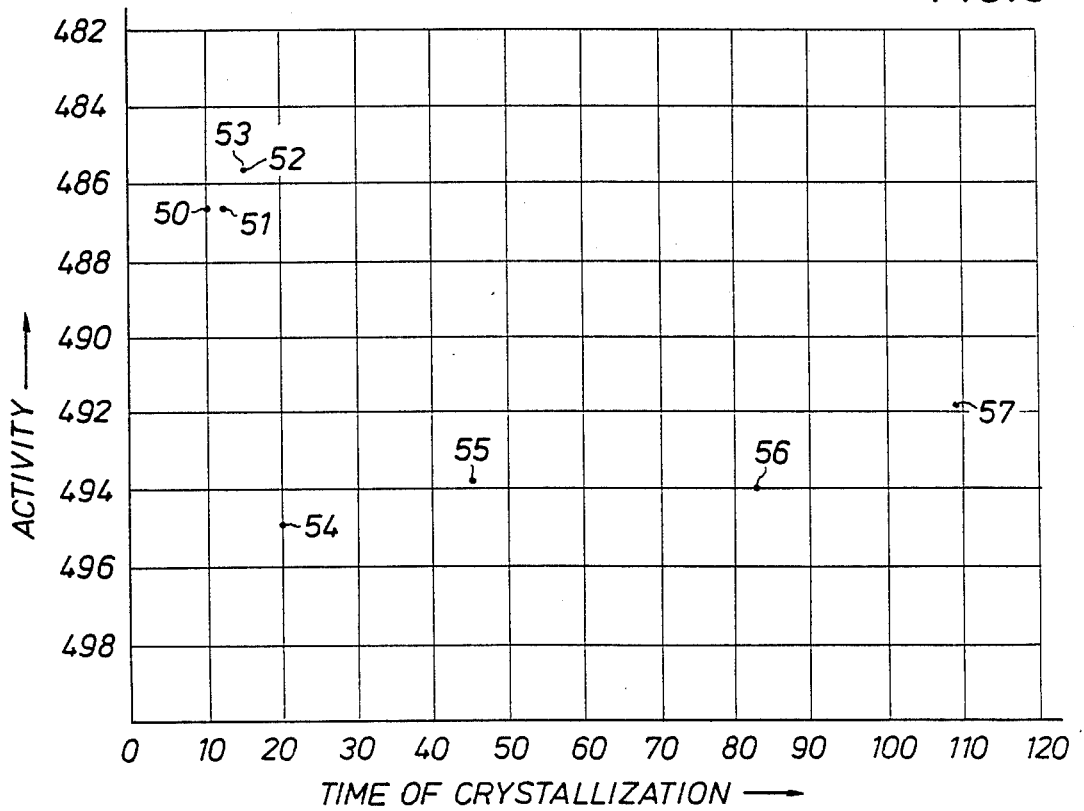
FIG. 5 demonstrates the relative activity of hydrogen ferrierite catalyst derived from crystallized sodium ferrierite after the latter undergoes 10 to 20 hours of hydrothermal treatment versus other ferrierites derived from 20+ to 110 hours of hydrothermal treatment.

FIG. 5 exemplifies the activity bunching-pattern of tests 50–55 which is derivative of ceasing hydrothermal treatment at 20 hours or less. Tests 50–53 all possessed significantly better activity than tests of catalysts derived from sodium ferrierite crystallized over 20 hours. The reasons for this phenomena are not yet well understood, but it can be assumed that the resultant sodium ferrierite prepared by this method is a different composition of matter vis-a-vis that derived by other known technique preparations.

What I claim as my invention is:

1. A method of manufacture of sodium ferrierite which comprises crystallizing an aqueous mixture at hydrothermal crystallizing conditions of from about 100° to about 400° C. over a period of time greater than 10 hours and less than 100 hours to form a crystalline sodium ferrierite, said aqueous mixture comprising a sodium compound, one or more aluminum compounds, a silicon compound and one nitrogen compound selected from the group consisting of piperidine, piperazine, pyridine, 4-picoline-N-oxide and 4-picoline, wherein the mole ratios of both the sodium compound and aluminum compound, in relation to the silicon compound, calculated on the basis of the oxide forms of said sodium compound, aluminum compound and silicon compound, are equal to the presence of 1.6 to 3.4 moles of sodium oxide per 25 moles of said silicon oxide and 0.7 to 1.6 moles of said aluminum oxide per 25 moles of said silicon oxide, and wherein water is present in a molar ratio of 5–500 moles of water per mole of said silicon oxide and said nitrogen compound is present in a molar ratio of 0.05 to 1.0 moles of said nitrogen compound per moles of said silicon oxide and where the mole ratio of sodium oxide to aluminum oxide is greater than 1, and calcining said crystalline sodium ferrierite.

2. The method of manufacture of claim 1 wherein said sodium ferrierite is treated by ion exchange to essentially remove sodium ions and to thereby form a hydrogen species of ferrierite.

3. The method of manufacture of claim 2 wherein said ion exchange is performed in the presence of an ion exchange agent comprising ammonium nitrate.

4. The method of manufacture of claim 1 wherein said sodium compound added to the crystallization mixture is sodium silicate, wherein said aluminum compound added to the crystallization mixture is aluminum sulfate and wherein said silicon compound added to said crystallization mixture is selected from the group consisting of silica gel, sodium silicate and mixtures thereof.

5. The method of manufacture of claim 1 wherein said nitrogen compound is piperidine.

6. A method of manufacture of claim 1 wherein the ratio of SiO$_2$/Al$_2$O$_3$/Na$_2$O is equal to 25 moles of SiO$_2$/0.9–1.1 mole Al$_2$O$_3$/2.3–2.7 moles of Na$_2$O.

7. A method of preparing a hydrogen ferrierite aluminosilicate which comprises crystallizing over a period of time of greater than 10 hours and less than 100 hours, at hydrothermal crystallization conditions, an aqueous mixture comprising:
  i. one or more compounds of sodium (MX);
  ii. one or more compounds of aluminum (AlX);
  iii. one or more compounds of silicon (SiX);
  iv. a nitrogen compound selected from the group consisting of alkyl piperidine, piperazine, pyridine, 4-picoline-N-oxide and 4-picoline represented by (RN); and
  v. water;
wherein the mole ratio of said components is equal to:
  (a) water to (SiX) of 5 to 500;
  (b) (RN) to (SiX) of 0.05 to 1.0
  (c) (MX) per 25 moles of (SiX) of 1.6 to 3.4; and
  (d) (AlX) per 25 moles of (SiX) of 0.7 to 1.6;
and wherein the quantities of (MX) and (AlX) are calculated on the basis of their oxide form regardless of the form of said compounds added to said aqueous mixture, calcining said mixture, to prepare a crystallized sodium ferrierite catalyst precursor and treating said catalyst precursor in an ion exchange means to exchange said sodium ions with hydrogen ions and to thereby prepare said hydrogen ferrierite.

8. The method manufacture of claim 7 wherein said ion exchange means comprises contact with ammonium ions.

9. A method of manufacture of claim 8 wherein said ammonium ions are derived from a salt comprising ammonium nitrate.

10. A method of manufacture of claim 7 wherein said (MX) and (SiX) compounds are added as sodium silicate, and said (AlX) compound is added as aluminum sulfate.

11. The method of manufacture of claim 7 wherein said hydrothermal crystallization conditions include a temperature of from 100° to 400° C.

12. A method of manufacture of a sodium ferrierite catalyst precursor which comprises:
  (a) forming an admixture of compounds in an aqueous solvent of one or more compounds of sodium, one or more compounds of aluminum, one or more compounds of silicon and piperidine wherein the molar ratio of said silicon, aluminum and sodium compounds when calculated on the basis for the oxide form is equal to:
    i. 1.6 to 3.4 moles of said sodium oxide per 25 moles of said silicon oxide;
    ii. 0.7 to 1.6 moles of said aluminum oxide per mole of 25 moles of said silicon oxide;
    iii. 125 to 12,500 moles of water per 25 moles of said silicon oxide;
    iv. 1.25 to 25 moles of said piperidine per 25 moles of said silicon oxide; and
    v. a ratio of sodium oxide to aluminum oxide of greater than 1;
  (b) crystallizing said aqueous mixture to form a sodium ferrierite at hydrothermal treatment conditions including a temperature of from 100° to 400° C. and a period of time greater than 10 hours and less than 100 hours.
  (c) removing said crystallized sodium ferrierite from the residual mother liquor of said crystallization step (b); and
  (d) calcining said crystalline material in air to remove occluded amine.

13. The method of manufacture of claim 12 wherein said sodium compound added to said crystallization mixture is sodium silicate, said aluminum compound added to said crystallization is aluminum silicate, said silicon compound added to said crystallization mixture is selected from the group consisting of silica gel and sodium silicate and said piperidine is added to said crystallization mixture as piperidine.

14. The method of manufacture of claim 12 wherein said sodium ferrierite removed from step (c) is ion exchanged in the presence of ammonium nitrate and then calcined to form a species of hydrogen ferrierite catalyst from said sodium ferrierite catalyst precursor.

15. The method of manufacture of claim 12 wherein said admixture of compounds in said aqueous solvent comprises 1.07 moles of aluminum compound, calculated in the oxide form, per 25 moles of said silicon oxide and 2.48 moles of sodium compound, calculated in the oxide form, for 25 moles of silicon oxide.

* * * * *